UNITED STATES PATENT OFFICE.

HENRY W. PARTIN, OF PORTSMOUTH, VIRGINIA.

METHOD OF TREATING MOLTEN METAL.

933,576. Specification of Letters Patent. Patented Sept. 7, 1909.

No Drawing.　　Application filed September 10, 1908.　Serial No. 452,478.

*To all whom it may concern:*

Be it known that I, HENRY W. PARTIN, a citizen of the United States, residing at Portsmouth, in the county of Norfolk and State of Virginia, have invented certain new and useful Improvements in Methods of Treating Molten Metal, of which the following is a specification.

My invention relates to an improvement in a method of treating molten iron, and the object is to treat any kind of iron, such as cast iron, wrought iron, cast steel or wrought steel, and to treat all classes of steel and iron, such as tools of any character, railroad steel, structural steel, and castings of all kinds, armor plate, machine gun shields and the like.

The molten metal is treated with a compound which is mixed with the molten metal for the purpose of hardening and toughening it. By treating the metal in this manner it produces a very much finer fiber, and castings can be made in open molds. The surface of the metal after it is finished is practically smooth and free from air holes and becomes very tough and hard.

The following is the composition of matter which is added to the molten metal: silica; borax; bicarbonate of soda; cobalt; black oxid of manganese, and ferrum reductum, or reduced iron or nickel. These ingredients are mixed together in equal proportions, and about one pound of the composition is mixed with about one hundred and fifty (150) pounds of molten metal. More or less of the mixture or compound is added to the molten metal being treated according to the degree of hardness of the metal desired. This mixture is poured into the metal while in a molten state and the mixture is added to the molten metal in such quantities as to obtain the degree of hardness required of the metal for the particular purpose for which the metal is used.

By this composition I am enabled to obtain results in hardening and toughening iron or steel which makes the quality of the iron or steel treated far superior to any metal now on the market. I can obtain the same results by omitting certain of the ingredients, but I prefer to use all of the ingredients specified.

Having fully described my invention, what I claim as new and desire to secure by Letters Patent is:—

1. A method for treating molten iron or steel consisting in mixing with the molten metal a composition containing silica, borax, cobalt, and black oxid of manganese.

2. A method for treating molten iron or steel consisting in mixing with the molten metal a composition containing silica, borax, cobalt soda, and black oxid of manganese.

3. A method for treating molten iron or steel consisting of mixing the molten metal with a composition containing silica, borax, cobalt soda, black oxid of manganese, and ferrum reductum.

In testimony whereof I affix my signature, in the presence of two witnesses.

HENRY W. PARTIN.

Witnesses:
　HERBERT C. EMERY,
　VERNON E. HODGES.